United States Patent [19]
van der Lely

[11] 3,885,632
[45] May 27, 1975

[54] SOIL COMPRESSING ATTACHMENTS FOR IMPLEMENTS

[76] Inventor: Cornelis van der Lely, 7, Bruschenrain, Zug, Switzerland

[22] Filed: June 26, 1973

[21] Appl. No.: 373,881

[30] Foreign Application Priority Data
June 27, 1972 Netherlands .................. 7208816

[52] U.S. Cl. .................. 172/68; 172/545; 172/552
[51] Int. Cl. .................. A01b 49/00; A01b 21/06
[58] Field of Search ....... 172/59, 68, 149, 151, 177, 172/518, 540, 545, 546, 552; 180/20; 305/4; 404/121, 122, 124, 128; 301/45

[56] References Cited
UNITED STATES PATENTS
1,915,561   6/1933   VanDerveer .......................... 305/4
3,774,688   11/1973  Van der Lely et al ................ 172/39

FOREIGN PATENTS OR APPLICATIONS
1,939,182   2/1970   Germany ........................ 172/121

Primary Examiner—Edgar S. Burr
Assistant Examiner—Paul T. Sewell
Attorney, Agent, or Firm—Mason, Mason & Albright

[57] ABSTRACT

A cultivator attachment comprising a soil compressing member which includes a roller having a substantially horizontal axis of rotation. At least two longitudinal ground engaging elements are pivotably connected to the roller and mounted for pivotal movement in common with respect to said axis of rotation.

17 Claims, 3 Drawing Figures

PATENTED MAY 27 1975　　3,885,632
FIG.1
FIG.2
FIG.3
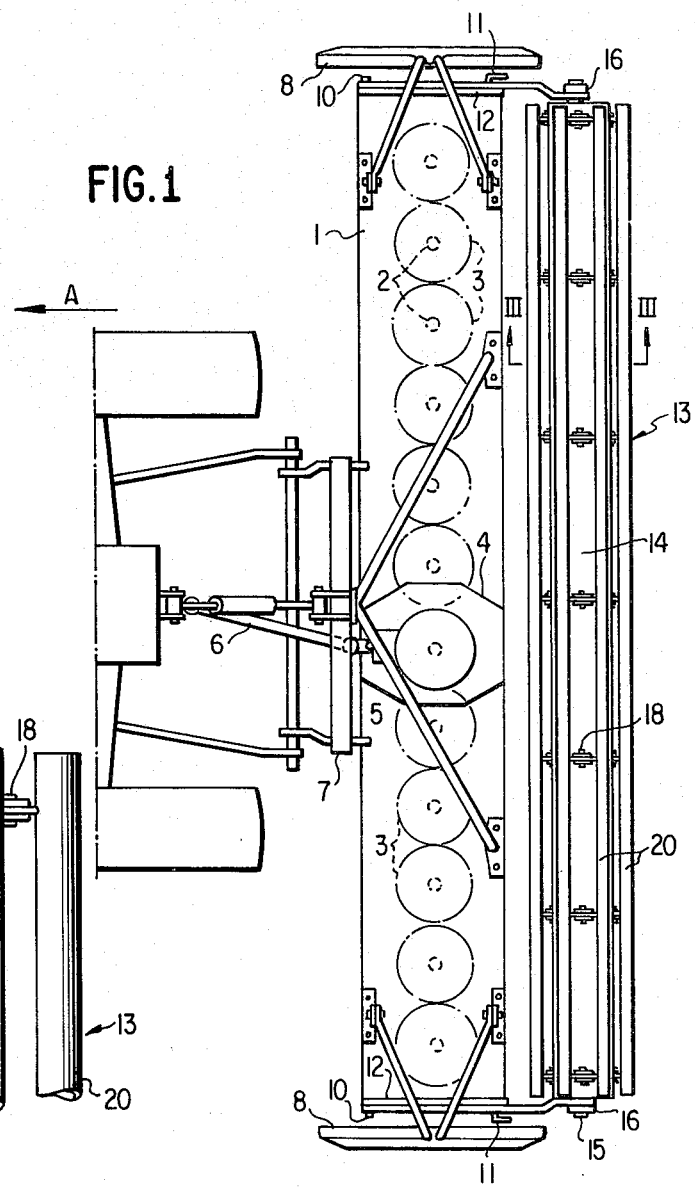
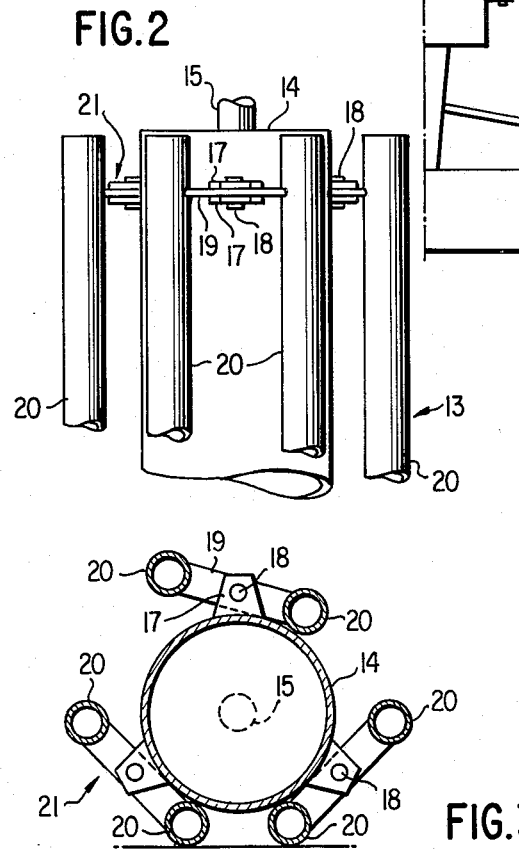

3,885,632

SOIL COMPRESSING ATTACHMENTS FOR IMPLEMENTS

According to the invention, there is provided a soil compressing attachment of the kind set forth, wherein each of said movable parts comprises at least two longitudinal elements which are pivotable, in common, with respect to the axis of rotation of said roller means.

For a better understanding of the invention, and to show how the same may be carried into effect, reference will now be made, by way of example, to the accompanying drawings, in which:

FIG. 1 is a plan view of a rotary harrow mounted at the rear of an agricultural tractor, said harrow incorporating a rotary soil compressing member attachement in accordance with the invention, FIG. 2 is a scrap plan view, to an enlarged scale, showing one end of the rotary soil compressing member of FIG. 1 in greater detail, and FIG. 3 is a section, to an enlarged scale, taken on the line III—III of FIG. 1.

Referring to the drawings, the soil cultivating implement or cultivator that is illustrated is a rotary harrow having a hollow frame portion 1 that extends substantially horizontally perpendicular to the intended direction of operative travel of the harrow which is indicated by an arrow A in FIG. 1 of the drawings. The harrow comprises a plurality (in this case, twelve) of rotary soil working members that are not visible in the drawings but each of which is located beneath the hollow frame portion 1 at the lower end of a corresponding substantially vertical, or at least upwardly extending, shaft 2. Each of the substantially vertical shafts 2 is rotatably journalled in substantially vertical bearings carried by the frame portion 1 and each shaft 2 carries, inside the frame portion 1, a corresponding straight- or spur-toothed pinion 3. The pinions 3, like the underlying soil working members themselves, are arranged in a single row and the teeth of each pinion 3 are in mesh with those of its neighbor or both of its neighbors. The shafts 2 are spaced apart from one another by regular distances that are preferably substantially 25 centimeters and each soil working member (not illustrated) is provided with at least one soil working tine that is arranged to trace a circle, during the operation of the harrow, whose diameter is a little greater than the perpendicular distance between the axes of rotation of neighboring soil working members. Thus, the strips of soil that are worked by the individual soil working members or rotors overlap one another to produce, in effect, a single broad strip of worked soil whose width in a horizontal direction perpendicular to the direction A is substantially the same as that of the hollow frame portion 1. The shaft 2 corresponding to one of the center pair of soil working members has an upward extension into a gear box 4 that is mounted on top of the frame portion 1. Bevel pinions or other transmission members located inside the gear box 4 place the upward extension of the shaft 2 that has just been mentioned in driven connection with a rotary input shaft 5 of the gear box 4 whose leading splined or otherwise keyed end projects forwardly from that gear box in a direction substantially parallel to the direction A. During the use of the rotary harrow, the input shaft 5 is placed in driven connection with the power take-off shaft of an agricultural tractor or other operating vehicle with the aid of a telescopic transmission shaft 6 of a construction that is known per se having universal joints at its opposite ends. The front of the frame portion 1 with respect to the direction A is provided with a coupling member 7 of generally triangular configuration and this coupling member is connected to the three-point lifting device or hitch at the rear of the operating tractor or other vehicle in the manner which is shown in outline in FIG. 1 of the drawings. The coupling member 7 is located substantially centrally of the breadth of the harrow and strengthening rods or the like interconnect its apex and anchorages at the top and rear of the frame portion 1 with respect to the direction A. Plates 8 that serve as screens and guards are provided at the opposite ends of the row of soil working members and function to reduce to a minimum any formation of ridges of inadequately crumbled soil at the margins of the broad strip of worked land and also to prevent the tines of the soil working members at the ends of the row from flinging stones or other hard objects laterally of the harrow at a dangerous speed. The plates 8 are substantially vertically disposed during the operation of the harrow and are turnable upwardly and downwardly relative to the frame portion 1 about substantially horizontal axes that are substantially parallel to the direction A, said axes being afforded by pivots mounted on top of the frame portion 1.

Arms 9 are connected to the opposite ends of the frame portion 1 so as to be turnable upwardly and downwardly relative thereto about a substantially horizontal axis that is substantially perpendicular to the direction A, said axis being afforded by aligned pivot pins 10 that are located close to the front of the frame portion 1 with respect to the direction A. Generally sector-shaped plates 12 are fastened to the opposite ends of the frame portion 1 in substantially vertical positions and their rearmost edges with respect to the direction A are formed with rows of holes that are equidistantly spaced from the axis defined by the pivot pins 10. Each arm 9 is formed with a single hole that can be brought into register with any chosen one of the row of holes in the corresponding plate 12 and horizontal locking pins 11 are provided for entry through the holes in the arms 9 and through chosen holes in the plates 12 to maintain the arms 9 in corresponding angular settings about the axis defined by the aligned pivot pins 10. A rotary soil compressing member 13 in the general form of a ground roller is mounted between the rearmost ends of the two arms 9 with respect to the direction A. In addition to effecting compaction of the earth freshly crumbled by the preceding soil working members, the rotary soil compressing member or roller 13 serves to sustain the harrow from the ground during its operative progress thereover in the direction A. The member 13 comprises roller means in the form of a central roller-like right circular cylinder 14 whose opposite closed ends have aligned stub shafts 15 rigidly secured to them. The stub shafts 15 are received in substantially horizontal bearings 16 carried at the rearmost ends of the arms 9 so that the whole member 13 is freely rotatable about a substantially horizontal axis that is substantially perpendicular to the direction A.

The external surface of the cylinder 14 is provided with three rows of supporting lugs 17, said lugs being arranged in closely adjacent pairs and the three rows thereof being regularly spaced apart from one another around the longitudinal axis of the cylinder 14 by angles of 120°. It can be seen from FIG. 1 of the drawings that each row of the lugs 17 extends parallel to the axis of rotation of the whole soil compressing member 13 and comprises seven pairs of the lugs 17 disposed in regularly spaced apart relationship. The lugs 17 project substantially radially with respect to the axis of rotation that corresponds with the longitudinal axes of the stub shafts 15 and each pair of lugs 17 has a corresponding straight arm 19 rockably mounted between it by means of a corresponding pivot pin 18 that defines an axis parallel to the axis of rotation of the whole soil compressing member. The arms 19 are contained in substantially vertical planes that are substantially parallel to the direction A and the pivotal connection of each arm 19 to the corresponding pair of lugs 17 is located midway along the length of that arm. Longitudinal elements 20 in the form of tubes of circular cross-section are secured to the ends of the arms 19 so as to extend parallel to the axis of rotation of the member 13, it being evident from the drawings that each element 20 is thus secured to the same ends of the seven arms 19 that all correspond to one of the three rows of pairs of lugs 17. The two elements 20 that are carried by the seven arms 19 which correspond to one row of the pairs of lugs 17 are spaced apart from one another by a perpendicular distance which is substantially equal to one-eighth of the circumference of the cylinder 14.

The pairs of longitudinal elements 20 are turnable by way of the arms 19 about axes afforded by the aligned pivot pins 18 and constitute movably mounted peripheral parts 21 of the member 13, said parts being pivotable about the axes defined by the pivot pins 18 to only a limited extent. The pivotal rocking movement which has just been mentioned is limited in each of two opposite directions by stops which, in the embodiment that has been described, are afforded by portions of the outer convex surface of the central cylinder 14. It will be seen from the drawings that the radially inner edges of the arms 19 come into contact with the outer surface of the cylinder 14 to define the limits of the pivotal movements of the elements 20 about the axes of the pins 18 that are possible. The arrangement of the pivot pins 18 midway along the lengths of the arms 19 ensures that the movably mounted peripheral parts 21 are turnable about axes that are disposed midway between the corresponding pairs of longitudinal elements 20.

In the use of the rotary harrow that has been described, the operating tractor or other vehicle moves it over the ground in the direction A, the harrow being sustained from the ground surface by the member 13 which not only compacts the freshly worked soil but is the primary factor in controlling the depth to which the tines of the foregoing soil working members penetrate into the ground, adjustment of this depth being effected by engaging the locking pins 11 with alternative holes in the plates 12. As the rotary soil compressing member 13 rolls over the freshly worked soil, it actually contacts that soil principally by way of the pairs of longitudinal elements 20 of the peripheral parts 21 which parts 21 rock about the axes afforded by the corresponding pins 18 between the limits defined by contact of regions of the radially inner edges of the arms 19 with the concave outer surface of the cylinder 14. These repeated rocking movements, combined with the striking of the cylinder 14 by the arms 19 prevent any large quantities of mud or other wet soil from sticking to the elements 20 and the arms 19 for any appreciable periods so that there is no appreciable build up of mud and the like between the elements 20 and the cylinder 14. Rotary soil compressing members of known construction often present the disadvantage that, when working on very heavy and/or wet soil, and particularly when tightly compacting freshly worked soil of that kind, the soil, in a muddy condition, sooner or later surrounds the exterior of the member and/or fills its interior to an extent which prevents the harrow or other soil cultivating implement from compressing the freshly worked earth and to an extent which seriously interferes with the working depth control function of the rotary soil compressing member. The construction which has been described avoids, or greatly reduces, the disadvantage that has just been described.

Each movably mounted peripheral part 21 of the rotary soil compressing member 13 may include more than two longitudinal elements 20 and there may be more than three such parts 21 arranged around the periphery of the central closed cylinder 14. The rotary soil compressing member 13 that has been described forms part of a soil cultivating implement or cultivator in the form of a rotary harrow but it will be apparent that the member 13 is, in effect, a soil compressing attachment that could equally well be employed with other implements that involve the compaction of soil and that, when employing known roller constructions, are subject to the disadvantage that has been described above.

Although various features of the rotary soil compressing member and rotary harrow that have been described and/or illustrated in the accompanying drawings will be set forth in the following claims as inventive features, it is emphasised that the invention is not necessarily limited to those features and that it includes within its scope all of the parts of the rotary soil compressing member and rotary harrow that have been described and/or illustrated both individually and in various combinations.

What I claim is:

1. A soil compressing attachment for travel over the ground comprising a roller rotatably mounted on a horizontal axis, said roller including movably mounted peripheral parts, said parts comprising two spaced apart elongated ground engaging elements mounted on rockable arms, said arms extending substantially parallel to a plane which extends perpendicular to the axis of rotation of said roller, said arms having ends and at least one pivot pin between said ends connected to support means on said roller, said elongated elements extending substantially parallel to one another and said elements being connected to said arms on opposite sides of said pivot pin, said arms and said elements being rockable about an axis defined by said pivot pin and said axis extending in a direction substantially parallel to the axis of rotation of said roller.

2. An attachment as claimed in claim 1, wherein said two elements form a pair and there are a plurality of pairs of said elements each of which is pivotable about at least one corresponding pivot pin having an axis that is substantially parallel to the axis of rotation of said roller.

3. An attachment as claimed in claim 1, wherein said roller includes a central cylinder and the rocking movements of said elements are limited in at least one direction by said cylinder.

4. An attachment as claimed in claim 3, wherein the rocking movements of said elements are limited in two opposite directions by said cylinder.

5. An attachment as claimed in claim 1, wherein said elements extend across subtantially the length of said roller.

6. An attachment as claimed in claim 2, wherein each of said pairs is pivotable about pivot pins on support means that projects radially from said axis of rotation.

7. An attachment as claimed in claim 2, wherein the corresponding pivot axis of each pair is located midway between the two elements of said pair.

8. An attachment as claimed in claim 7, wherein said elements of each pair are pivotably supported on said support means at a plurality of locations along their lengths.

9. An attachment as claimed in claim 1, wherein said roller includes a central cylinder and the periphery of said cylinder comprises three movable pairs of said elements, each of said pairs including at least two elements, said three pairs of elements being spaced apart from one another by even distances.

10. An attachment as claimed in claim 1, wherein said elements are tubular.

11. An attachment as claimed in claim 10, wherein said tubular elements are circular in cross-section.

12. An attachment as claimed in claim 1, wherein said arms are pivotally mounted on lug supports and said supports are secured to a central cylinder of said roller.

13. An attachment as claimed in claim 12, wherein said cylinder is of right circular cylindrical configuration.

14. An attachment as claimed in claim 1, wherein said roller is a rear-mounted part of a soil cultivating implement having a frame and said implement includes a plurality of soil-working members that are rotatable about their respective upwardly extending shafts, said shafts being supported on said frame in a row that extends transverse to the direction of travel.

15. An attachment as claimed in claim 14, wherein said roller extends throughout substantially the entire working width of said soil-working members.

16. An attachment as claimed in claim 15, wherein said roller is pivotally connected to a frame of said soil cultivating implement by adjustable arm means having means for fixing said roller in different vertical positions with respect to said frame, whereby the working depths of the said soil-working members are variable.

17. A soil compressing attachment for travel over the ground comprising an elongated roller rotatably mounted on a horizontal axis, said roller including a centrally positioned cylinder and a plurality of rockable elongated soil contacting elements pivotably connected to said cylinder around the periphery thereof, said elements being spaced apart and extending parallel to one another and to the axis of rotation of said cylinder, said elements being mounted in pairs and each pair being pivotably mounted for rockable movements about pivot pins, said pivot pins being retained by support means on said cylinder, said pivot pins being located substantially midway between each pair of elements.

* * * * *